(12) United States Patent
Jang et al.

(10) Patent No.: US 9,641,041 B2
(45) Date of Patent: May 2, 2017

(54) FAN MOTOR

(71) Applicant: NEW MOTECH CO., LTD., Gwangju (KR)

(72) Inventors: Jeong Cheol Jang, Gwangju (KR); Gyeong Su Park, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 272 days.

(21) Appl. No.: 14/415,597

(22) PCT Filed: Jun. 24, 2013

(86) PCT No.: PCT/KR2013/005551
§ 371 (c)(1),
(2) Date: Jan. 18, 2015

(87) PCT Pub. No.: WO2014/042341
PCT Pub. Date: Mar. 20, 2014

(65) Prior Publication Data
US 2015/0180300 A1    Jun. 25, 2015

(30) Foreign Application Priority Data

Sep. 17, 2012    (KR) .................. 10-2012-0102628

(51) Int. Cl.
*H02K 5/16*       (2006.01)
*H02K 11/33*      (2016.01)
*H02K 5/04*       (2006.01)

(52) U.S. Cl.
CPC ............. *H02K 5/161* (2013.01); *H02K 11/33* (2016.01); *H02K 5/04* (2013.01); *H02K 5/16* (2013.01)

(58) Field of Classification Search
CPC   H02K 5/04; H02K 5/16; H02K 5/161; H02K 11/33

(Continued)

(56) References Cited

U.S. PATENT DOCUMENTS 3,732,616 A * 5/1973 Masrrodonato .......... H02K 5/04
                                                    29/510
5,767,596 A * 6/1998 Stark ....................... H02K 5/00
                                                    29/596

(Continued)

FOREIGN PATENT DOCUMENTS

CN     1255586 A    6/2000
CN     1476145 A    2/2004

(Continued)

OTHER PUBLICATIONS

International Search Report for PCT/KR2013/005551 mailed Sep. 11, 2013 from Korean Intellectual Property Office.

*Primary Examiner* — John K Kim
(74) *Attorney, Agent, or Firm* — Revolution IP, PLLC

(57) ABSTRACT

A fan motor according to the present invention includes a lower bracket having a center portion through which a rotating shaft passes, a bracket welding groove formed at an upper portion, and a lower bearing insertion space formed around the rotating shaft outside the center portion; an upper bracket having a center portion through which the rotating shaft passes, a bracket welding projection formed at a position corresponding to the bracket welding groove of the lower bracket, and an upper bearing insertion space formed around the rotating shaft inside the center portion; a rotor combined with the rotating shaft and rotating inside the upper bracket; and a stator positioned around the rotor, and the bracket welding groove and the bracket welding projection are tightly coupled to each other through ultrasonic welding.

6 Claims, 3 Drawing Sheets

(58) Field of Classification Search
USPC .......................................... 310/14, 15, 89, 90
IPC ........................................................ H02K 5/16
See application file for complete search history.

(56) References Cited

U.S. PATENT DOCUMENTS

| | | | |
|---|---|---|---|
| 6,170,275 B1 | 1/2001 | Ueno et al. | |
| 6,577,031 B2 | 6/2003 | Morooka et al. | |
| 6,603,228 B1 * | 8/2003 | Sato ...................... | B23K 11/31 |
| | | | 310/12.32 |
| 6,809,453 B2 | 10/2004 | Narita et al. | |
| 6,830,440 B1 | 12/2004 | Riddoch | |
| 6,926,497 B2 | 8/2005 | Lin et al. | |
| 6,943,471 B2 | 9/2005 | Toyokawa et al. | |
| 7,635,934 B2 | 12/2009 | Zhu et al. | |
| 2004/0256933 A1 | 12/2004 | Toyokawa et al. | |
| 2007/0205676 A1 | 9/2007 | Lan et al. | |
| 2008/0164784 A1 * | 7/2008 | Huang .................... | H02K 5/08 |
| | | | 310/49.01 |
| 2015/0180300 A1 * | 6/2015 | Jang ....................... | H02K 11/33 |
| | | | 310/90 |

FOREIGN PATENT DOCUMENTS

| | | |
|---|---|---|
| CN | 101807832 A | 8/2010 |
| JP | 6214950 U | 1/1987 |
| JP | 07-111756 A | 4/1995 |
| JP | 2002-051501 A | 2/2002 |
| JP | 2003512004 A | 3/2003 |
| JP | 2004028174 A | 1/2004 |
| JP | 2004088909 A | 3/2004 |
| JP | 2005020802 A | 1/2005 |
| KR | 10-0511324 B1 | 8/2005 |
| KR | 10-2008-0105795 A | 12/2008 |
| KR | 10-2010-0030176 A | 3/2010 |
| KR | 10-2010-0039163 A | 4/2010 |
| KR | 10-1074935 B1 | 10/2011 |

* cited by examiner

FAN MOTOR

CROSS REFERENCE TO PRIOR APPLICATIONS

This application is a National Stage Application of PCT International Patent Application No. PCT/KR2013/005551 filed on Jun. 24, 2013, under 35 U.S.C. §371, which claims priority to Korean Patent Application No. 10-2012-0102628 filed on Sep. 17, 2012, which are all hereby incorporated by reference in their entirety.

TECHNICAL FIELD

The present invention relates to a motor. More specifically, the present invention relates to a fan motor having a structure which can reduce manufacturing cost by simplifying the manufacturing process further more and efficiently prevent penetration of moisture of outside.

Generally, a motor used to blow chilled air in a refrigerator or circulate air inside and outside of a certain device is referred to as a fan motor. In many cases, such a fan motor is generally installed in an environment containing plenty of moisture or generating condensation due to changes in temperature. Since the moisture may penetrate into the motor and generate a failure of the motor, a variety of structures for preventing penetration of moisture has been studied.

Korean Patent No. 10-0511324 and No. 10-1074935 and U.S. Pat. No. 6,577,031 disclose a technique of manufacturing a motor housing through resin molding by insert-injecting a stator, a printed circuit board and the like of a motor all together. According to these patents, since the motor housing is manufactured through resin molding to bury the stator and the printed circuit board inside the motor housing, it has a structure that is efficient in preventing moisture from penetrating into the motor. However, manufacturing a motor through the insert injection described above has a problem of increasing the process and cost needed for the insert injection, such as manufacturing a mold. Furthermore, since an insert injection process should be performed, the entire process is difficult to automate.

Therefore, in order to solve the aforementioned problems, the inventors of the present invention propose a fan motor of a new structure, which utilizes a structure of placing a stator inside a bracket, installing a printed circuit board outside the bracket, and sealing the bracket.

DISCLOSURE OF INVENTION

Technical Problem

Therefore, the present invention has been made in view of the above problems, and it is an object of the present invention to provide a fan motor of a new structure.

Another object of the present invention is to provide a fan motor which can reduce manufacturing cost by avoiding application of insert injection for manufacturing a motor housing.

Still another object of the present invention is to provide a fan motor having a structure which can automate the entire manufacturing process by avoiding application of insert injection.

All of the above objects of the present invention and other inherent objects may be easily accomplished by the present invention described below.

Solution to Problem

To accomplish the above objects, according to one aspect of the present invention, there is provided a fan motor including: a lower bracket having a center portion through which a rotating shaft passes, a bracket welding groove formed at an upper portion, and a lower bearing insertion space formed around the rotating shaft outside the center portion; an upper bracket having a center portion through which the rotating shaft passes, a bracket welding projection formed at a position corresponding to the bracket welding groove of the lower bracket, and an upper bearing insertion space formed around the rotating shaft inside the center portion; a rotor combined with the rotating shaft and rotating inside the upper bracket; and a stator positioned around the rotor.

In the present invention, the fan motor may further include a lower bearing press-fitted to a lower bearing press-fitting unit formed at an upper portion of the lower bearing insertion space; and a lower bearing cover having a lower welding projection formed at a position corresponding to a lower welding groove formed around the lower bearing insertion space of the lower bracket, and having a space section in which an end of the rotating shaft is positioned.

In the present invention, the fan motor may further include a lower felt positioned around the lower bearing; and a lower board push for supporting a lower portion of the lower bearing.

In the present invention, a lower oil return washer insertion unit may be formed at an upper portion of the lower bearing insertion space of the lower bracket, and a lower oil return washer may be inserted in the lower oil return washer insertion unit.

In the present invention, the fan motor may further include an upper bearing press-fitted to an upper bearing press-fitting unit formed at an upper portion of the upper bearing insertion space; and an upper bearing cover having an upper welding projection formed at a position corresponding to an upper welding groove formed around the upper bearing insertion space of the upper bracket.

In the present invention, the fan motor may further include an upper felt positioned around the upper bearing; and an upper board push for supporting a lower portion of the upper bearing.

In the present invention, an upper oil return washer insertion unit may be formed inside a center portion of the upper bearing cover, and an upper oil return washer may be inserted in the upper oil return washer insertion unit.

Advantageous Effects of Invention

The present invention has an effect of providing a fan motor which can reduce manufacturing cost and automate the entire manufacturing process by avoiding application of insert injection for manufacturing a motor housing.

MODE FOR THE INVENTION

The preferred embodiments of the present invention will be hereafter described in detail, with reference to the accompanying drawings.

Figure 1:
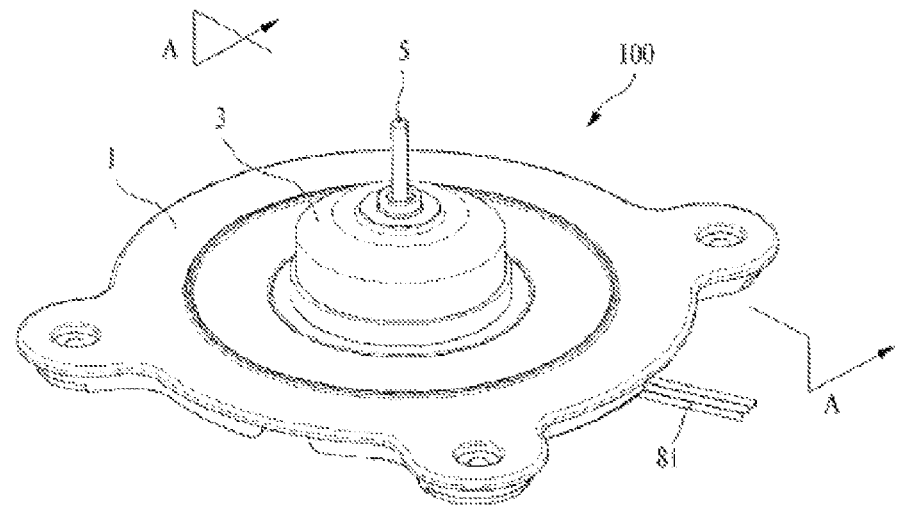
FIG. 1 is a perspective view showing a fan motor according to the present invention.

FIG. 1 is a perspective view showing a fan motor according to the present invention.

Viewing from outside, the fan motor 100 according to the present invention is configured of a lower bracket 1, an upper bracket 3 and rotating shaft 4, as shown in FIG. 1. The lower bracket 1 and the upper bracket 3 are formed as a plastic injection mold product, and they have a structure of being sealed with each other through ultrasonic welding. A stator, a rotor and the rotating shaft are placed inside the upper bracket 3, and a printed circuit board for supplying power to the stator and controlling rotation of the motor is placed at the outer lower portion of the lower bracket 1. Accordingly, a wire 81 connected to the printed circuit board is projected from the lower portion of the lower bracket 1 toward outside.

Figure 2:
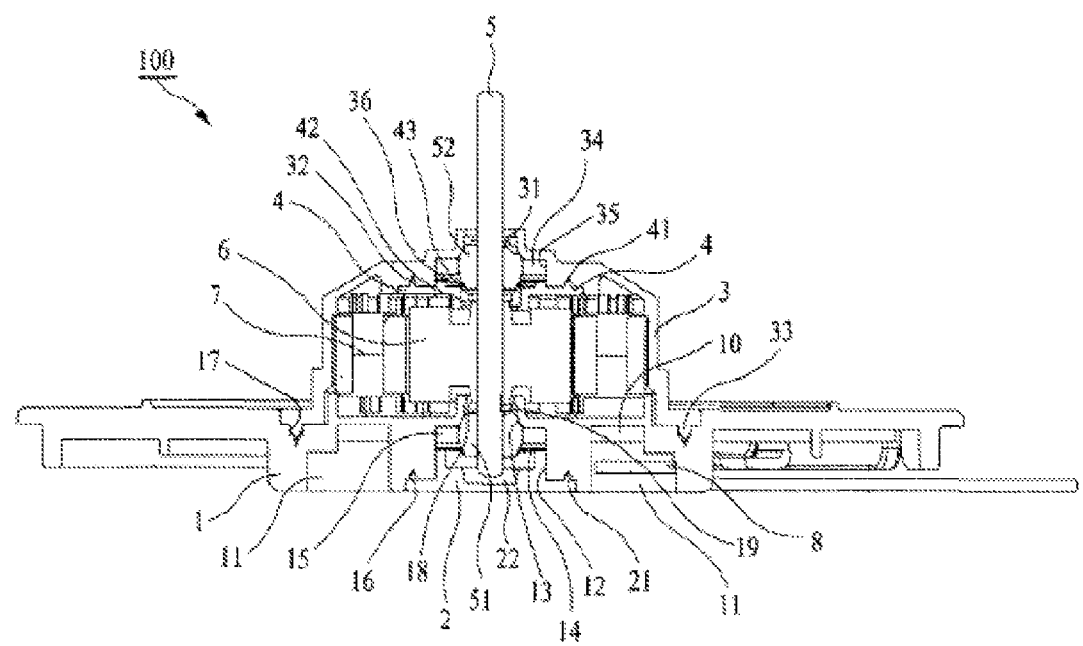
FIG. 2 is a cross-sectional view showing a fan motor according to the present invention, taken along the line A-A' of FIG. 1.

FIG. 2 is a cross-sectional view taken along the line A-A' of FIG. 1 to showing the cross section of a fan motor 100 according to the present invention.

As shown in FIG. 2, the fan motor 100 according to the present invention configures a motor housing by coupling the lower bracket 1 and the upper bracket 3. The lower bracket 1 and the upper bracket 3 are tightly coupled to each other through ultrasonic welding, and a rotor 6 and a stator 7 are placed in an inner space formed by the lower bracket 1 and the upper bracket 3 sealed with each other. For the ultrasonic welding, a bracket welding groove 17 is formed in the lower bracket 1, and a bracket welding projection 33 is formed in the upper bracket 3 at a position corresponding to the bracket welding groove 17 of the lower bracket 1. The bracket welding projection 33 is tightly fixed to the bracket welding groove 17 through ultrasonic welding. Of course, the bracket welding groove 17 may be formed in the shape of a projection, and the bracket welding projection 33 may be formed in the shape of a groove.

The printed circuit board (PCB) 8 is inserted into a PCB insertion space 11 formed in a lower outer space of the lower bracket 1. A coil (not shown) wound around the stator 7 should be electrically connected to the printed circuit board 8. To this end, a coil passage 10, which is a passage for passing the coil, is formed at the lower bracket 1 to penetrate the inside and outside of the lower bracket 1. After the printed circuit board 8 is inserted into the PCB insertion space 11, a sealing material (refer to symbol 82 of FIG. 6) is filled in the PCB insertion space 11 other than the space occupied by the printed circuit board 8.

The rotating shaft 6 is placed to penetrate the lower bracket 1 and the upper bracket 3 through the center. The lower portion of the rotating shaft 5 is supported, while rotating, by a lower bearing 51, and the upper portion of the rotating shaft 5 is supported, while rotating, by an upper bearing 52 placed inside the center portion of the upper bracket 3.

The lower bearing 51 is placed in a lower bearing insertion space 12 formed at the center portion of the lower bracket 1, and the upper portion of the lower bearing 51 is press-fitted to a lower bearing press-fitting unit 13 formed at the upper center portion of the lower bearing insertion space 12. The lower portion of the lower bearing 51 is supported by a lower board push 14. A lower felt 15 is installed on the outer periphery of the lower bearing 51 to supply oil, i.e., a lubricant for supporting rotation of the bearing. A lower oil return washer insertion unit 18 is formed at the upper portion of the lower bearing press-fitting unit 13, and a lower oil return washer 19 is inserted in the lower oil return washer insertion unit 18 to prevent the oil from flowing out toward the upper portion of the lower bearing 51.

The lower bearing insertion space 12 of the lower bracket 1 where the lower bearing 51 is placed is tightly sealed while being covered by a lower bearing cover 2. To this end, a lower welding groove 16 is formed around the lower bearing insertion space 12 of the lower bracket 1, and a lower welding projection 21 is formed in the lower bearing cover 2 at a position corresponding to the lower welding groove 16. The lower bearing insertion space 12 is isolated from outside since the lower welding projection 21 is tightly coupled to the lower welding groove 16 through ultrasonic welding, and thus penetration of moisture from outside can be prevented. Of course, the lower welding projection 21 may be formed in the shape of a groove, and the lower welding groove 16 may be formed in the shape of a projection. A space section 22 is formed inside the center portion of the lower bearing cover 2, and an end of the rotating shaft 5 is placed in this space.

The upper bearing 52 is inserted into an upper bearing insertion space 33 of the upper bracket 3 and press-fitted to an upper bearing press-fitting unit 31 formed inside the center portion of the upper bracket 3. The lower portion of the upper bearing 52 is supported by an upper board push 34. An upper felt 34 is positioned on the outer periphery of the upper bearing 52 to keep oil for smooth rotation of the bearing. The upper bearing insertion space 35, which is a space where the upper bearing 52 is inserted, is tightly sealed and covered by an upper bearing cover 4. To this end, an upper welding groove 32 is formed in the upper bracket 3, and an upper welding projection 41 is formed in the upper bearing cover 4 at a position corresponding to the position of the upper welding groove 32. The upper welding projection 41 is tightly coupled to the upper welding groove 32 through ultrasonic welding. Of course, the upper welding projection 41 may be formed in the shape of a groove, and the upper welding groove 32 may be formed in the shape of a projection.

An upper oil return washer insertion unit 42 is formed inside the center portion of the upper bearing cover 4. An upper oil return washer 43 is inserted in the upper oil return washer insertion unit 42 to prevent the oil from leaking out toward the lower portion of the upper bearing 52.

Figure 3:
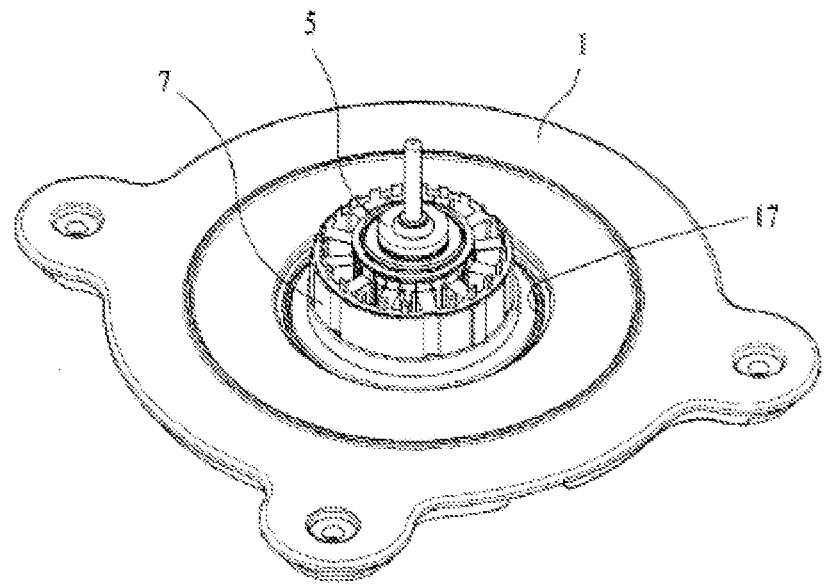
FIG. 3 is a perspective view showing a fan motor according to the present invention, from which an upper bracket is removed.

FIG. 3 is a perspective view showing a fan motor 100 according to the present invention, from which the upper bracket 3 is removed. Referring to FIG. 3, the fan motor 100 of the present invention is manufactured by positioning a rotating shaft 5, a rotor 6 and a stator 7 at a lower bracket 1 and coupling an upper bracket 3 to the lower bracket 1 through ultrasonic welding. Accordingly, this structure is more convenient and may reduce manufacturing cost compared with a structure forming a motor housing through insert injection.

Figure 4:
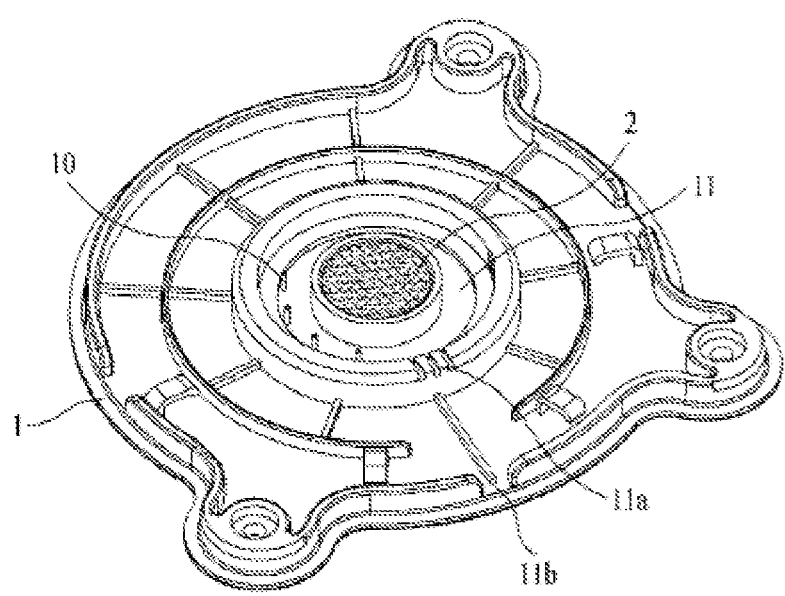
FIG. 4 is a perspective view of a fan motor according to the present invention, shown from the bottom side before combining a printed circuit board.
Figure 5:
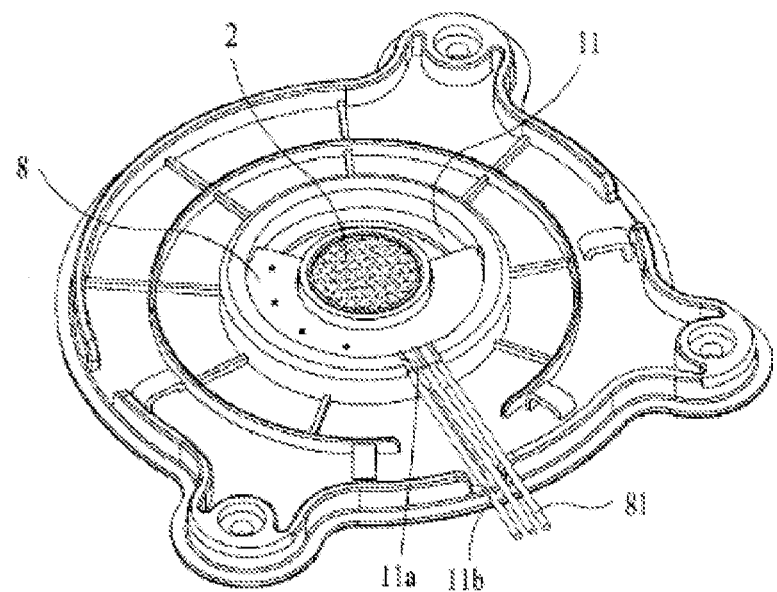
FIG. 5 is a perspective view of a fan motor according to the present invention, shown from the bottom side after combining a printed circuit board.
Figure 6:
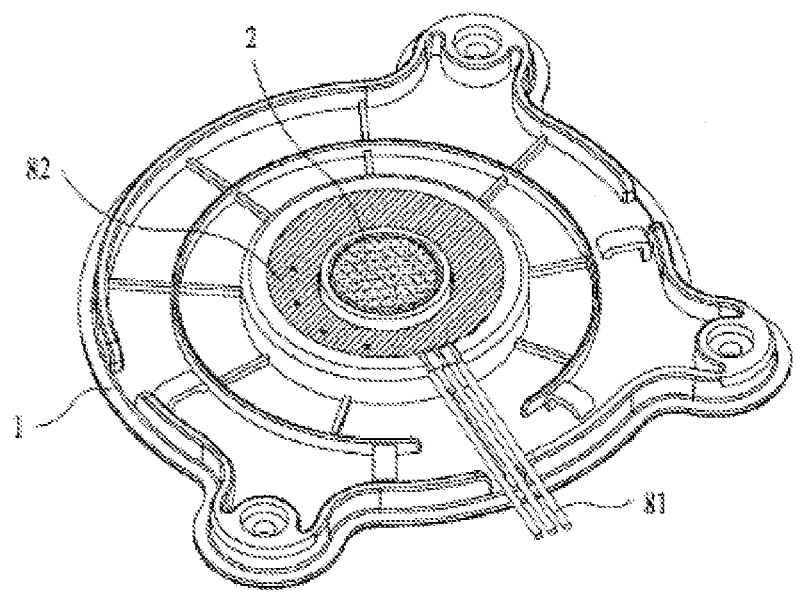
FIG. 6 is a perspective view of a fan motor according to the present invention, shown from the bottom side.

FIG. 4 is a perspective view of a fan motor according to the present invention, shown from the bottom side before combining a printed circuit board, FIG. 5 is a perspective view of a fan motor according to the present invention, shown from the bottom side after combining a printed circuit board, and FIG. 6 is a perspective view showing a fan motor 100 according to the present invention, in which spaces around the printed circuit board 8 are filled with a sealing material.

Referring to FIG. 4, a printed circuit board 8 is inserted into a PCB insertion space 11 formed at an outer lower portion of the lower bracket 1. A coil (not shown) wound around the stator 7 is electrically connected to the printed circuit board 8 through a coil passage 10 formed at the lower bracket 1. Referring to FIG. 5, the printed circuit board 8 is connected to an external power supply through a wire 81, and a wire groove 11a is formed at a portion of the outer circumference of the PCB insertion space 11 to pass the wire 81, and a wire pass hole 11b for passing and organizing the wire is formed at the lower outermost side of the lower bracket 1.

As shown in FIG. 6, after the printed circuit board 8 is inserted into the PCB insertion space 11, a sealing material 82 is filled in the space other than the printed circuit board 8. A variety of materials such as a urethane molding, a sealant, a thermosetting adhesive and the like may be used as the sealing material.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A fan motor comprising:
   a lower bracket having a center portion through which a rotating shaft passes, a bracket welding groove formed at an upper portion, and a lower bearing insertion space formed around the rotating shaft outside the center portion;
   an upper bracket having a center portion through which the rotating shaft passes, a bracket welding projection formed at a position corresponding to the bracket welding groove of the lower bracket, and an upper bearing insertion space formed around the rotating shaft inside the center portion;
   a rotor combined with the rotating shaft and rotating inside the upper bracket;
   a stator positioned around the rotor;
   a lower bearing press-fitted to a lower bearing press-fitting unit formed at an upper portion of the lower bearing insertion space; and
   a lower bearing cover having a lower welding projection formed at a position corresponding to a lower welding groove formed around the lower bearing insertion space of the lower bracket, and having a space section in which an end of the rotating shaft is positioned.

2. The fan motor according to claim 1, further comprising:
   a lower felt positioned around the lower bearing; and
   a lower board push for supporting a lower portion of the lower bearing.

3. The fan motor according to claim 1, wherein a lower oil return washer insertion unit is formed at an upper portion of the lower bearing insertion space of the lower bracket, and a lower oil return washer is inserted in the lower oil return washer insertion unit.

4. A fan motor comprising:
   a lower bracket having a center portion through which a rotating shaft passes, a bracket welding groove formed at an upper portion, and a lower bearing insertion space formed around the rotating shaft outside the center portion;
   an upper bracket having a center portion through which the rotating shaft passes, a bracket welding projection formed at a position corresponding to the bracket welding groove of the lower bracket, and an upper bearing insertion space formed around the rotating shaft inside the center portion;
   a rotor combined with the rotating shaft and rotating inside the upper bracket;
   a stator positioned around the rotor;
   an upper bearing press-fitted to an upper bearing press-fitting unit formed at an upper portion of the upper bearing insertion space; and
   an upper bearing cover having an upper welding projection formed at a position corresponding to an upper welding groove formed around the upper bearing insertion space of the upper bracket.

5. The fan motor according to claim 4, further comprising:
   an upper felt positioned around the upper bearing; and
   an upper board push for supporting a lower portion of the upper bearing.

6. The fan motor according to claim 4, wherein an upper oil return washer insertion unit is formed inside the center portion of the upper bearing cover, and an upper oil return washer is inserted in the upper oil return washer insertion unit.

* * * * *